Dec. 20, 1960 G. STRANSKY 2,965,062
HATCH COVER CONSTRUCTIONS
Filed May 5, 1955 5 Sheets-Sheet 2
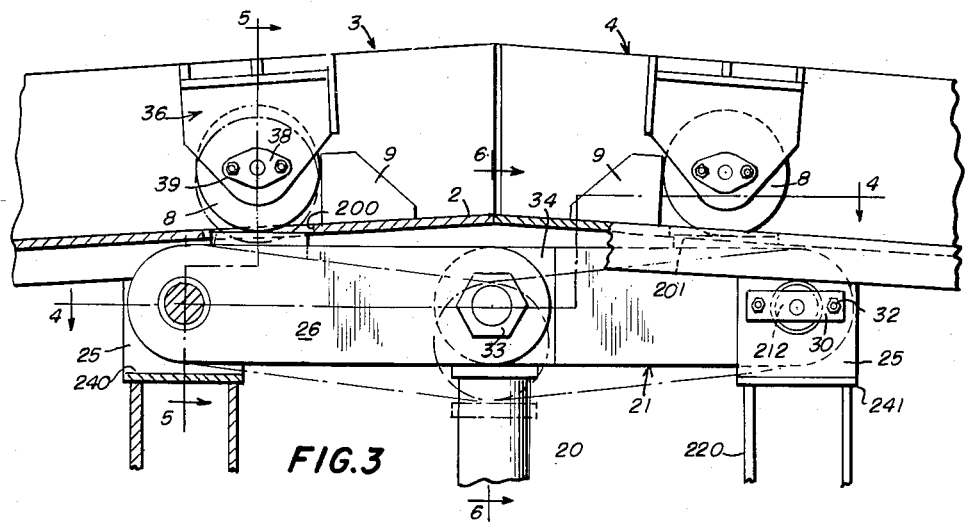
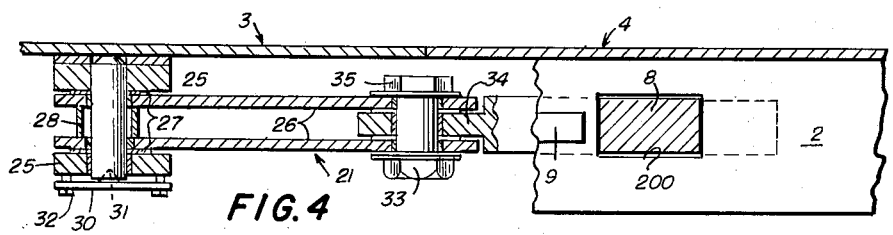
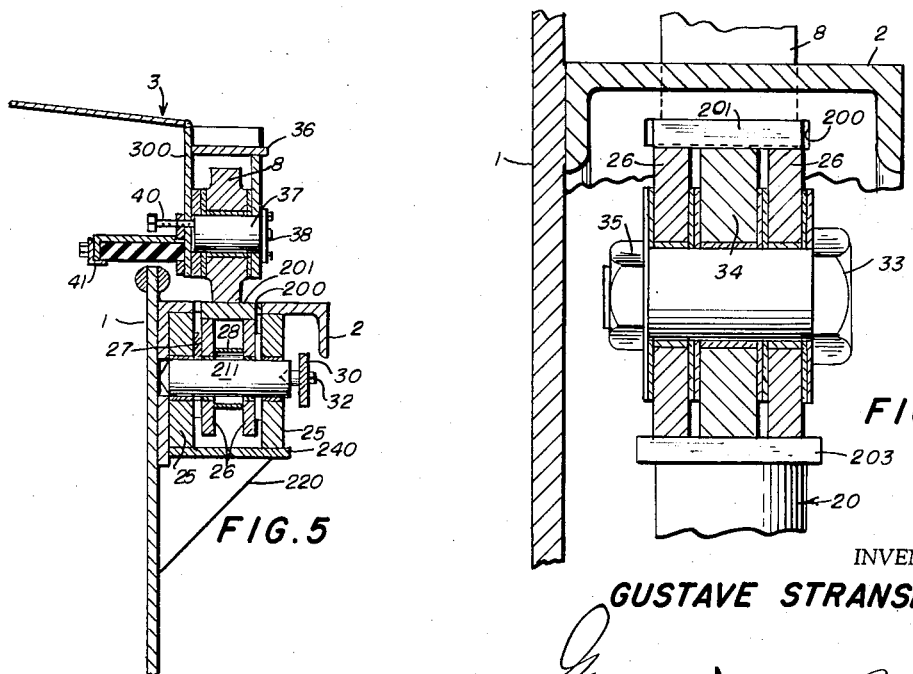
INVENTOR
GUSTAVE STRANSKY
ATTORNEYS

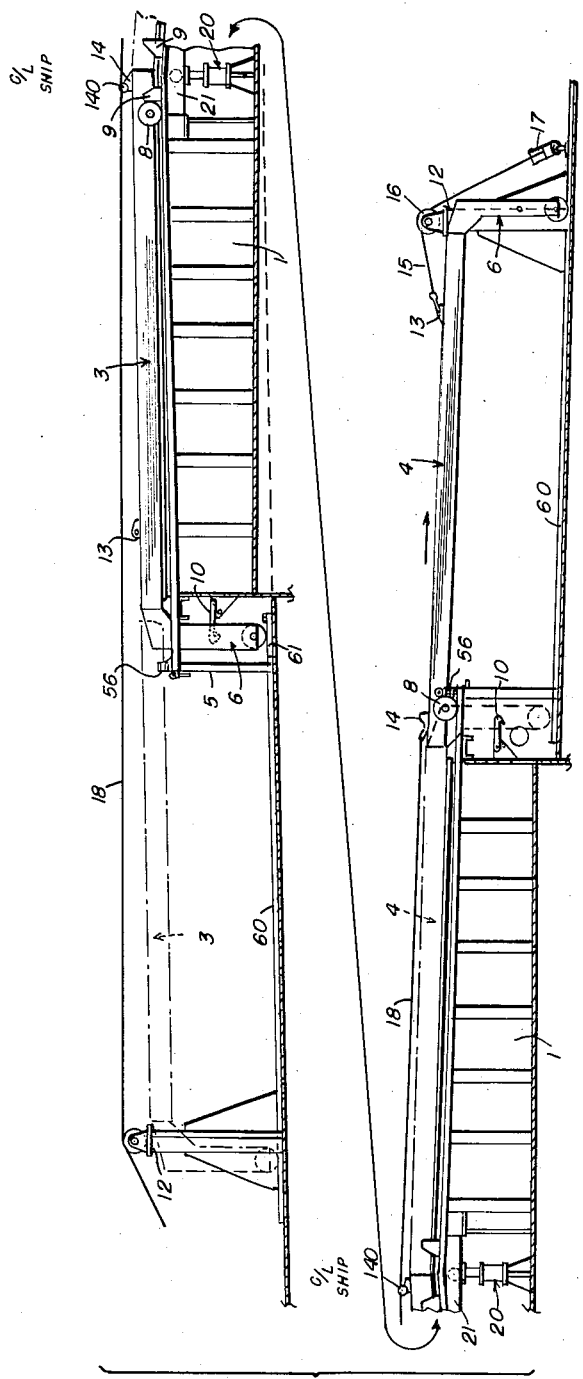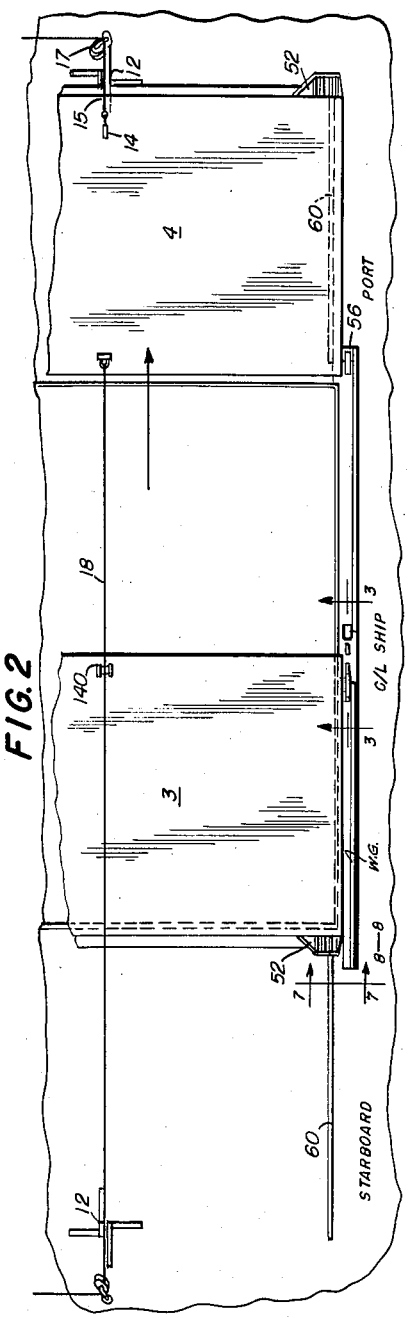
INVENTOR
GUSTAVE STRANSKY
ATTORNEYS

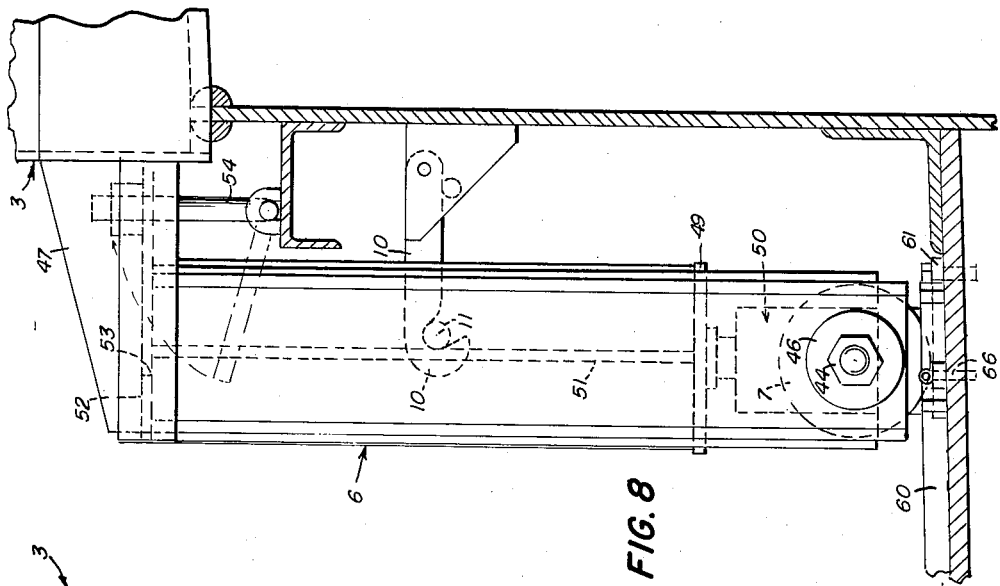

Dec. 20, 1960 G. STRANSKY 2,965,062
HATCH COVER CONSTRUCTIONS
Filed May 5, 1955 5 Sheets-Sheet 4
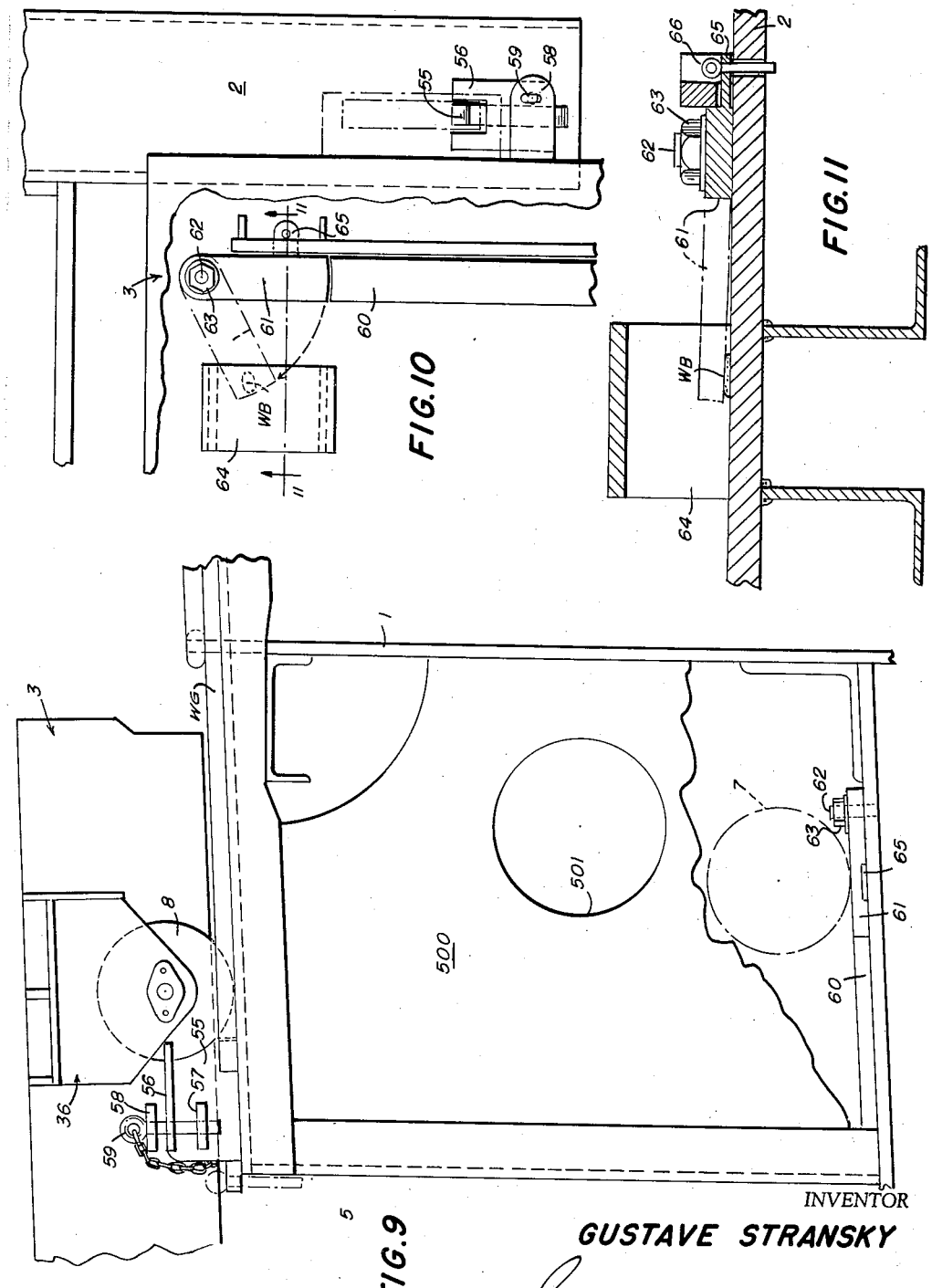
INVENTOR
GUSTAVE STRANSKY
BY
ATTORNEYS Dec. 20, 1960 — G. STRANSKY — 2,965,062
HATCH COVER CONSTRUCTIONS
Filed May 5, 1955 — 5 Sheets-Sheet 5
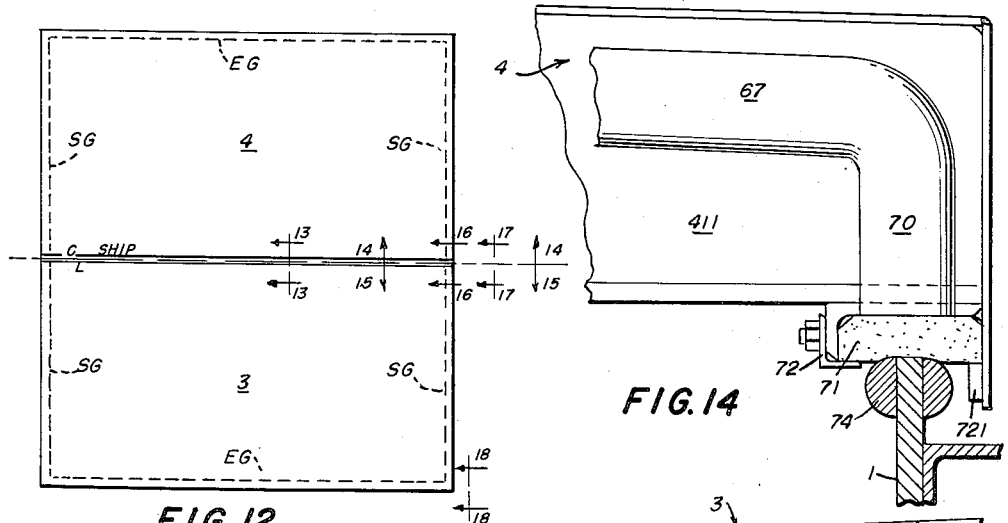
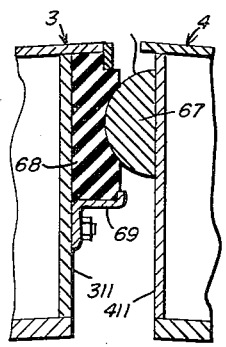
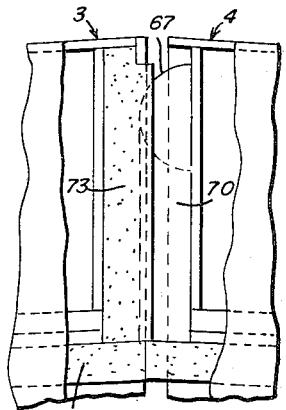
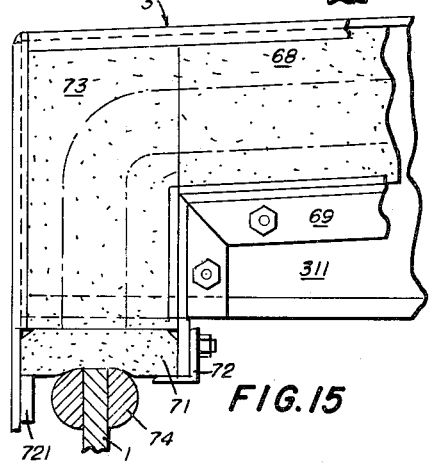
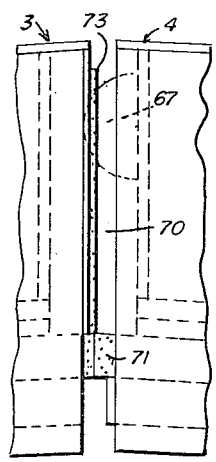
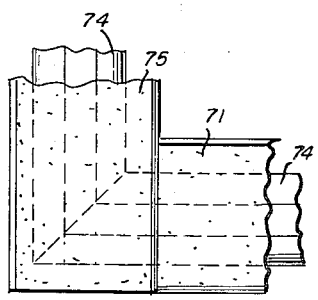
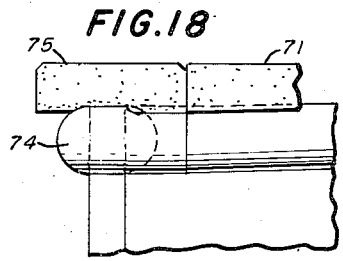
INVENTOR
GUSTAVE STRANSKY
ATTORNEYS United States Patent Office 2,965,062
Patented Dec. 20, 1960

2,965,062

HATCH COVER CONSTRUCTIONS

Gustave Stransky, 14 E. 28th St., New York, N.Y.

Filed May 5, 1955, Ser. No. 506,274

9 Claims. (Cl. 114—202)

This application is directed to certain improvements in the art of hatch cover constructions for vessels. More particularly, it concerns improvements in hatch cover arrangements of the type in which one or more cover sections are supported for rolling movement relative to a hatch opening.

While the invention is primarily related to hatch cover arrangements of the rolling type, certain aspects thereof are not to be limited to such arrangements inasmuch as problems solved by these aspects are applicable to folding hatch cover arrangements and thus the field of invention is not to be limited to the particular details and examples set forth in the ensuing description. These improvements, however, are restricted to metal hatch covers.

Accordingly, the invention has for an object to provide an improved hatch cover arrangement incorporating a sealing means between the hatch opening and the cover arrangement which facilitates the construction and/or replacement of the sealing components and ensuring an adequate seal.

It is a further object to provide such a hatch cover arrangement and improved jacking means for preliminarily lifting the cover section or sections relative to the opening to break the seal existing between the sealing components so as to permit the rolling movement of the cover relative to the opening.

It is a further specific object to provide an improved hatch cover arrangement including a pair of cover sections movable in opposite directions relative to a hatch opening, a sealing arrangement between the sections and the opening including a vertical joint between the respective sections, a jacking means for the cover supporting wheels adjacent the meeting line of the two sections, outer supporting legs carrying wheels for supporting opposite ends of the respective sections, deck tracks for said last mentioned wheels and a pivoted track section means incorporated with said deck track for movement about a vertical axis to ensure proper position and sealing contact of the peripheral seal between cover and opening when the cover sections are closed.

Further and more specific objects will be apparent from the following description taken in connection with the accompanying drawings illustrating one embodiment of the invention and in which:

Figure 1 is a view partly in side elevation and partly in vertical section illustrating a hatch cover arrangement including two cover sections mounted for movement athwartship of a vessel, Figure 2 is a fragmentary top plan view of the structure shown in Figure 1 on a reduced scale, Figure 3 is a cross-sectional view on an enlarged scale with parts shown in elevation taken along line 3—3 of Figure 2 and illustrating the jacking means disposed centrally of the hatch opening, Figure 4 is a horizontal cross-sectional view taken along lines 4—4 of Figure 3, Figure 5 is a vertical cross-sectional view taken along line 5—5 of Figure 3, Figure 6 is a vertical cross-sectional view taken along line 6—6 of Figure 3, Figure 7 is a fragmentary end elevation on an enlarged scale as viewed along viewing line 7—7 of Figure 2.

F.gure 8 is a side view of the structure shown in Figure 7 as viewed along viewing line 8—8 of Figure 2, Figure 9 is a fragmentary view on an enlarged scale illustrating the lefthand corner of the starboard hatch structure with the cover section moved to open position, Figure 10 is a top plan view with parts broken away of the structure shown in Figure 9, Figure 11 is a vertical cross-sectional view on an enlarged scale taken along line 11—11 of Figure 10, Figure 12 is a diagrammatic plan view of the cover sections shown in Figure 1 in closed condition and with the wheels and supporting legs eliminated, Figure 13 is a vertical cross-sectional view on an enlarged scale taken along line 13—13 of Figure 12, Figure 14 is a fragmentary vertical cross-sectional view on an enlarged scale taken along line 14—14 of Figure 12 and illustrating in elevation one of the inner corners of one cover section, Figure 15 is a similar view taken along line 15—15 of Figure 12 and illustrating the opposite and cooperating corner of the other cover section, Figure 16 is a vertical cross-sectional view on an enlarged scale taken along lines 16—16 of Figure 12 with the side plates of the cover sections broken away, Figure 17 is a fragmentary side elevational view on an enlarged scale as viewed along the viewing line 17—17 of Figure 6, Figure 18 is a fragmentary elevational view on an enlarged scale illustrating one outer corner of the hatch and showing the details of the coaming and gasketing arrangement with the cover details removed and as viewed along viewing line 18—18, and Figure 19 is a top plan view of the arrangement shown in Figure 17.

In the arrangement shown in Figures 1 and 2, only one hatch opening has been illustrated and which opening can be one of a series of openings arranged fore and aft of a cargo vessel. Thus, a hatch coaming 1 delimits the opening and is provided along the sides and ends of the opening with a half round compression bar means illustrated in detail in Figures 18 and 19. Along the fore and aft sides of the opening the outer sides of the coaming are provided with wheel supporting tracks 2 along which cover sections 3 and 4 roll in cover opening and closing movements. The track sections 2 have extensions that project beyond the port and starboard ends of the coaming, Figure 1 being a view looking aft of the vessel. These track extensions are supported by vertical supports denoted generally at 5 in Figure 2. Between the vertical supports 5 and the hatch coaming 1, there is arranged a filler plate 500 having an aperture 501 therein for reducing weight. This structure, while shown in Figure 9, has been eliminated from Figure 1 for purposes of clarity. In addition, a wheel guide extends along the track 2. This guide WG is illustrated in Figure 9. The cover sections 3 and 4 are each provided with side gasket means described hereinafter that form a peripheral seal for the hatch opening and the adjacent meeting ends of the respective sections are provided with an improved seal described hereinafter.

The track sections 2 slope downwardly away from the center line of the vessel and the respective cover sections are provided with supporting legs 6 carrying rollers 7. The rollers 7 roll on a wheel track provided on the deck, the details of which are disclosed in Figures 9, 10 and 11. The inboard wheels 8 of each cover section are further illustrated in Figures 3 and 4. In the general arrangement of Figures 1 and 2, the cover section 3 which is the starboard section is shown in closed position. Center wheel stops 9 are mounted on the track 2 to limit the inboard rolling movement of the respective sections. Hold back means shown diagrammatically at 10 cooperate with a pin 11 on each of the supporting legs 6 so that cover section 3 is illustrated as locked in its inboard position. Cover section 4 is shown in full lines in open position. Bracket supported sheave posts 12 are mounted on the deck at an area spaced from the outboard sides of the coaming a distance such as to accommodate the cover sections in open position. The respective cover sections are provided with hauling pads 13 and 14 adjacent the opposite ends thereof in relation to their line of movement. To open cover section 4, cable 15 is secured to hauling pad 13. The cable is led over a sheave 16 mounted on the sheave post and thence over a snatch block 17 connected by a swivel joint to a deck pad on the deck, the cable then passing to a suitable boom or winch. The hold backs 14 have a roller 140 on the top thereof so that in closing these covers a cable 18 can be connected to the pad 14 on the cover of section 4 and which cable passes over the roller 140 provided on the holdback pad on the cover section 3, thence over a sheave on the opposite sheave post 12 through a snatch block or another equivalent arrangement to a further winch. Thus the cover sections are individually manipulated between open and closed positions. Wheel stop means 56 described hereinafter with reference to Figures 9 and 10 are mounted on the top of each track extension to form stops for the center wheels when the cover sections have been moved to open position. In order to properly jack up the cover sections before moving them to open position, the arrangement includes a center jack means denoted generally at 20 on each fore and aft side of the hatch cooperating with lifting arms denoted generally at 21 that simultaneously lift up the inboard or center wheels 8 and thus raise the center joint portions of both cover sections a distance sufficient to place the wheels on a level with the track sections 2. Additional jacking means are mounted on the deck outward of the opposite ends of the hatch and adjacent the inner position of the wheel supporting legs 6 so that the outer ends of the hatch covers can be lifted to break the seal and the wheels 7 can be raised to the level of the wheel tracks on the deck. The details of the several jacking arrangements will be described hereinafter, it being clear that having opened cover section 4, to open cover section 3 the holdback latch 10 is released, the cable 18 connected to the hauling pad 13 and assuming the center jack and the jacks for the leg supported wheels have been actuated to lift section 3 and the pivoted deck track section described hereinafter is closed, cover section 3 is moved to the left to the dotted line position shown.

The details of the inner wheel mountings and the center jacking means are illustrated in Figures 3–6. As shown in Figures 3 and 4, the track 2 is provided with openings 200 through which the wheels 8 drop when the covers are in their closed position, the wheel stops 9 limiting the inward rolling movement of the respective cover sections 3 and 4.

The center jacks 20 are mounted to exert vertical lift at the median line between the cover sections. On the opposite sides of this line and outward of the openings 200 in the track are vertically disposed supporting brackets 22, 220, these supporting brackets reinforcing the deck and mounting the pivot points for the lifting arms that form part of the jack. The jack proper includes lifting arm means pivoted together in line with the median line of the sections and at their ends pivotally connected to the coaming above the brackets 22, 220. Each jack 20 includes a plate member 203 that is secured to the lifting head of the jack to exert a lift force upwardly by raising the lifting arms 21. The upper surface of each lifting arm includes a wheel raising platform 220 which is movable into the hole 200 in the track to raise the inboard wheels 8 on cover sections 3 and 4 to the level of the track. The lifting arm mechanism, Figures 4 and 5, includes at the opposite ends thereof pivot pins 211, 212. These pivot pins are supported between the under surface of the track 2 and platforms 240, 241 that are mounted at the top of the vertical brackets 22, 220 by apertured block means 25. The block means are welded to the under surface of the track 2 and the upper surface of platforms 240, 241. Bushings are disposed in the apertures in the block means 25 and the pivot pins 211, 212 are engaged within the bushings. The lifting arm to the left in Figure 4 includes a pair of spaced and similar links 26. Between each link 26 and adjacent block 25 are washer means 27 and the respective links 26 are spaced apart by a ferrule 28 welded in place. Thus the pair of links 26 move together and form one lifting arm. The pivot pin 211 has axial and radial bores therein through which lubricant can be fed to the bushings that are mounted internally of the apertures in the block means 25 and the links 26. An alemite fitting 29 supplies lubricant. To hold the pin 211 in position an end plate 30 having a conical head 31 projecting from its inner side and fitting in a correspondingly shaped recess in the outer end of the pin 211 is bolted in position by nut and bolt means 32. If desired, the conical head can protrude from the pin 211 and engage a conical recess in the plate. The right hand lifting arm is substantially similar except that it has only one point of engagement with the central pivot pin 33. The right hand lifting arm 21 has an intermediate extension 34 welded between the two links that constitute the right hand lifting arm. Thus the links 26 and the intermediate extension 34 are pivotally interconnected by the pivot pin 33. Washer means are disposed between the headed end of the pivot pin and between the links 26 and the extension 34. A nut 35 secures the pivot pin 33 in position. This pin is provided with an axial bore and radial apertures to feed lubricant to the bushings that lie in the apertures in the links 26 and the extension 34. The links 26 and the intermediate extension 34 comprise a double lever arm means with the outer end of each lever arm of the lever arm means overlying the jack means and having an upwardly curved surface as shown in Figure 3 for the purposes of reducing friction between the lift platform 203 and the undersurface of the links 26 and extension 34 respectively. Thus when lift force is applied to the lever arms along the vertical center line of the pivot pin 33 the lever arm means are raised to dispose the wheel platforms at a level with the track 2 whereupon the cover sections 3 and 4 are elevated sufficiently to break the peripheral seal.

Figure 5 illustrates the mounting of the inboard wheels 8 on the respective cover sections. As shown, the cover side plates 300 have welded thereto a wheel supporting housing 36 which is apertured to accommodate the wheel supporting stud 37. Wheel 8 is rotatably mounted relative to this stud. The stud is held in place by end plates 38 with cooperating nut and bolt means 39 that are secured to the outer side wall of the wheel housing. A jacking bolt 40 is mounted on the inner surface of the cover side plate 300 for applying force to the wheel supporting pin 37 to move the same outwardly when it is desired to change wheels. The peripheral gasket strip is mounted to the inner face of the cover side plate 300 for cooperation with the bar at the top of the coaming. The gasket strip is removable for replacement since the angle member 41 that holds the gasket in place is bolted to the channel iron that houses the gasket.

The outer pair of wheels and the track extensions are more clearly illustrated in Figures 7–11. As shown in Figure 7, which is correlated with cover section 3, each corner of the hatch cover is provided with a depending wheel supporting leg means 6. The leg is formed by channel irons 42 which are maintained in spaced relation by spacers 43. Channel irons 42 at their lower ends are apertured to accommodate the wheel supporting pin 243 for the wheel 7. The pin is a bolt threaded at its outer end and held in place by nut 44. Set screw 45 locks the nut in clamping position. The wheel assembly has a bushing interposed between its inner periphery and the pin, and bracing supports 46 are welded between the side webs of the respective channel irons 42. Suitable washers are provided on each side of the wheel. The top of the wheel legs are secured to lug-like supporting arms 47 that are welded to the end plate of the cover. One side, preferably, the inner side of each wheel leg is provided with a vertically extending box-like structure 48 that includes a bottom abutment plate 49 for cooperation with a lift jack denoted diagrammatically at 50. The lift jack is mounted on a foundation as explained with reference to Figures 10 and 11, it being understood that there are a pair of lift jacks 50 at each end of the hatch. Further the holdbacks 10 are pivoted to the end of the hatch coaming for cooperation with pins 11 projecting inwardly from the box-like structure 48. This structure includes a central supporting rib 51 so that at the upper level of the wheel legs 6 there is a top plate structure 52 that is notched as at 53 to accommodate one of the hold-down dogs 54 that are pivotally mounted on a channel iron that extends across the end of the cover. This arrangement provides a very rigid wheel supporting leg structure which mounts the pin 11 of the holdback latching means and further incorporates the abutment plate 49 for cooperation with the outboard wheel lifting jacks. As indicated, with reference to Figure 1 and as shown in Figure 9, the opposite ends of the track 2 are provided with track extensions projecting beyond the end edges of the hatch opening and are supported by legs 5. The wheel legs 6 are disposed laterally inwards of the track supporting legs 5. The track extension is provided with a wheel stop 55 which at its top includes a bifurcated member 56 that fits on each side of the center wheel 8 when it has been moved to cover open position. The wheel stop has an apertured lug welded thereto for cooperation with a lug 58 that is welded to the side plate of the cover adjacent the center wheel. Thus, when the cover has been rolled to open position the center wheels 8 engage the wheel stops on the track extensions at which time the lug 58 is vertically aligned with the lug 57 whereupon a locking pin 59 is passed through apertures in the respective lugs and in one arm of the bifurcated member 56 to lock the cover in open position. A suitable chain mounts the locking pin 59 to the wheel stop 55.

Deck level track means extend outwards of the hatch coaming and as shown in Figures 1, 2, 9 and 10, each of these track means includes a fixed track section 60 including an upstanding wheel guide and a pivot section 61. Each pivot track section 61 pivots about a pin 62 that is welded to the deck and held in place by a nut 63. Adjacent each pivoted track section is a jack supporting foundation 64 for mounting the jacks 50 thereon. Thus when the cover sections are to be lowered to closed and sealed position, the jacks 50 are manipulated to support the outer ends of the covers so that the wheels 7 do not bear down on the pivot sections 61, whereupon each pivoted track section 61 is moved to the dotted line position shown in Figure 10 and thereafter the covers are lowered so that the wheels 7 fit down on the deck. Since the deck slopes downwards as is clear from Figure 9, and since the pin 62 and pivot section 61 are each disposed at 90° or at right angles to the deck, a weld bead WB is positioned as shown in Figures 10 and 11 so as to insure that when the pivot section 61 is moved to open position, it will be frictionally retained in that position. When the outer end of the cover is jacked up by actuation of the jacks 50, track section 61 is swung into the full line position of Figure 10 to support the wheels 7 at a level with fixed track section 60. As shown, the pivoted track section has an apertured lug 65 that passes through a slot in the vertically disposed wheel guide and this lug is held in place by a locking pin 66 carried by a chain secured to a suitable lug on the wheel guide. Thus, at the outer end of each hatch opening, track extensions are provided which at their top incorporate a wheel stop and components of cover locking means that are spaced from the end edge of the hatch opening a distance such that when the covers have been rolled to open position to engage the wheel stops the inner edge of the cover is clear of the opening. The cover carries other components of the locking means so that when the covers have been rolled to open position they can be locked in that position against the wheel stop and thus to the track extensions.

As stated, the deck is provided with a track to support the outer wheels 7 of each cover section. These wheels are carried by legs extending outwardly of the outer ends of the hatch cover section. In the illustrated form, the deck track is laterally inwardly of the track on the sides of the coaming.

If desired, inverted jacks can be mounted directly on the legs to apply lifting force directly against the deck.

The gasketing arrangement for the hatch cover relationship of Figures 1 and 2 includes side and end gaskets SG, EG, respectively and a center joint or gasket means, shown diagrammatically in Figure 12. Figure 13 is a cross section taken through the center joint illustrating the half round compression bar 67 welded to the end plate 411 of cover section 4 that cooperates with the gasket strip 68 supported on the end plate 311 of cover section 3. The gasket strip 68 is removably held in place by channel member 69 bolted to the end plate 311. As shown in Figure 14, the half round compression bar 67 includes a down-turned end 70 at each side thereof and extending along the sides and the opposite end of the cover section 4 is the side and end gasket structure. The side gasket 71 is held in place in the channel iron by angle member 72 that is bolted in position so that this gasket can be replaced when necessary. The cover section 3 has the horizontal gasket portion 68 described previously and a vertical gasket portion 73 that cooperates with the vertical legs 70 of the compression bar. Side gasket means 71 are removably held in place on the side and ends of the cover section 3 by angled gasket retainers 72. The top of the coaming is provided with half rounds 74 on opposite sides thereof for cooperation with the side and end gaskets. As shown in Figure 16, the vertical gasket strip 73 extends down into contact with the top of the side gasket and the lower end of the vertical legs 70 of the compression bar is also engaged with the top of the side gasket. It is clear that a very efficacious gasket joint between adjacent sections is provided by this arrangement.

Figures 18 and 19 illustrate the gasketing arrangement at a corner of a cover section wherein the end gasket 75 overlies the corner joint and the side gasket 71 abuts thereagainst. At the corner joint the half rounds 74 and the adjacent edges of the coaming are mitered. As shown in Figure 17, the side plates of the cover sections 3 and 4 terminate rearwardly of the side gaskets so that there is sufficient space to effect compression of the gaskets—both the horizontal center gasket and the vertical gasket—and the side gaskets to ensure an adequate seal. It is further to be pointed out that the gasket retainers 721 which extend along the sides and ends of the cover plates are bolted in position and can be removed for ease in changing gaskets.

Therefore the arrangement includes a peripheral gasket seal comprising gasket stripping carried by the sides and outboard ends of the cover sections and a center joint seal between adjacent sections comprising a gasket stripping including a horizontal portion extending along the inboard end of one cover and vertical gasket strips at the side edges of the same end of the cover and a cooperating compression member carried by the other cover section that includes a substantial horizontal portion across the face of the cover end and vertical leg portion for cooperation with the vertical gasket strip. The vertical leg portions as shown are formed by bending the ends of a half round or half oval bar at substantial right angles.

As clearly shown in the drawing, the peripheral gasket means 71 that extend along the opposite sides of the respective cover sections have respective projecting portions that extend beyond the inner ends, 311, 411 of the cover sections so as to be in abutting relation when the sections are closed. This arrangement is clearly shown in Figures 16 and 17. All the vertical portions of the center joint seal, namely, the vertical portion 70 of the rigid sealing bar member carried by the end of cover section 4 and the vertical compressible gasket stripping 73 carried by the end portion 311 of cover section 3 have lower ends overlying and in sealing engagement with the projecting portions of the peripheral gasket stripping 71 adjacent their abutting surfaces. Further, each vertical portion 70 of the rigid metal sealing member has an extent in the direction parallel to the sides of the cover section 4 that is greater than the extent in the same direction of the projecting portions of the gasket stripping 71 carried by that section 4, whereby the lower ends of the vertical portions 70 of the rigid sealing member overlie the joint between the abutting surfaces of the gasket stripping 71 that extend along the sides of the section.

The aforedescribed arrangement provides a seal between the meeting edges of two adjacent cover sections, that is a vertical joint. Thus the double lever arm jack arrangement applies simultaneous lift force to the supporting wheels of both of the cover sections.

The foregoing description makes clear that one phase of this invention is directed to a movable track portion that is moved beneath all the wheels to support the wheels at the level of the track or deck as the case may be.

It is to be pointed out that the expression "liquid-tight" utilized in the claims is to receive its broadest interpretation in that it refers to hatch cover constructions which are known in the art as water-tight hatch covers and which also refers to hatch cover constructions for closing hatches that receive liquid cargo. In this instance, the cover construction is not only water-tight in the general sense, but it also prevents leakage of cargo.

What is claimed is:

1. A liquid-tight hatch cover construction comprising means delimiting a hatch opening, at least two cover forming sections having opposite sides and inner and outer ends for cooperation with said means, supporting wheels carried by the opposite sides of the sections adjacent at least the inner ends thereof so that the sections are movable in opposite directions to effect opening and closing of the hatch, means providing wheel supporting surfaces extending at least along the opposite sides of the opening, said last mentioned means including pivoted portions disposed at the positions occupied by the wheels when the sections are in closing relation, said portions being movable into and out of alignment with the path of movement of the wheels to support the wheels in cover opening movement and to permit lowering of the wheels and cover sections when the same are in closing relation, means independent of said pivoted portions for moving the same into alignment with the path of movement of the wheels, compressible peripheral gasket means carried by the opposite sides and outer ends of each section, cooperating rigid sealing means carried by the means delimiting the opening whereby with the cover sections closed and the pivoted portions out of alignment with the supporting surfaces the sections by their weight effectively set the gasket means on the sealing members and the movement of the pivoted portions into alignment with the path of movement of the wheels would disrupt the sealing relationship between the peripheral gasket means and rigid sealing means, releasable dogging means for tightening the sections on the opening, a rigid sealing member carried by the inner end of one section that is adjacent the inner end of the other section, said member including vertical portions disposed adjacent the opposite sides of said one section, a cooperating compressible gasket strip means carried by the adjacent inner end of the other section and also including vertical portions adjacent the opposite sides of said other section, the peripheral gasket means along the opposite sides of the respective sections having projecting portions extending beyond the respective inner ends of the sections so as to be in abutting relation when the sections are closed, all said vertical portions including lower ends overlying and in sealing engagement with the projecting portions of the peripheral gasket means adjacent their abutting surfaces and the vertical portions of the rigid sealing member having an extent in the direction parallel to the sides of the section greater than the extent in the same direction of the projecting portions of the peripheral gasket means on said one section whereby the lower ends of said vertical portions of the rigid sealing member overlie the joint between said abutting surfaces and contact in sealing relation the projecting portions of the peripheral gasket means of both sections.

2. A liquid-tight hatch cover construction as claimed in claim 1, in which the means for moving the pivoted portions comprise fixedly mounted jack means and said pivoted portions of the wheel supporting surfaces including lever arm means pivotally connected to the means delimiting the opening for movement about an approximately horizontal axis and said lever arm means including an outer end overlying the jack means.

3. A liquid-tight hatch cover construction as claimed in claim 2, in which the outer end of the lever arm means that overlies the jack means includes an upwardly curved surface.

4. In a liquid-tight hatch construction for ships, a coaming including opposite sides and ends, at least two oppositely movable cover sections having inner and outer ends for cooperation with the coaming, track means extending along the opposite sides of the coaming, track extensions approximately at the level of said track means and extending beyond the opposite ends of the coaming for supporting the inner ends of the cover sections in open position, wheels carried by the opposite sides of each section adjacent the inner ends thereof that are adjacent to one another when the sections are closed, vertical legs depending from the opposite and outer ends of each section, wheels carried by the said legs, deck level track means for said last mentioned legs extending beyond the opposite ends of the openings for supporting the outer ends of the cover sections in open position, each said track means having openings therein for accommodating the respective wheels on the sections and legs when the cover sections are in closing relation, compressible gasket means carried by the sides and remote ends of each section, rigid sealing members on the coaming for engaging said gasket means when the cover sections are closed to provide a peripheral seal, means including pivotally mounted components mounted for swinging into and out of the openings in both track means when it is respectively desired to move the sections to open or closed position and to permit the cover sections to descend to effect sealing engagement between the gasket means and the sealing members, separate jack means adjacent the openings in the deck level track means and the openings in the first-mentioned track means respectively for raising and lowering the sections when they are to be moved relative to the coaming, cooperable gasket strip means and a rigid sealing member respectively carried by the adjacent inner ends of the sections to provide a seal between the sections, and means for tightening the sections with all the gasket means and rigid sealing members in sealing engagement.

5. A liquid-tight hatch construction for ships as claimed in claim 4, in which the pivotally mounted components for cooperation with opening in the track means along the sides of the coaming include lever arm means incorporating upper portions engageable with the wheels on the respective sections, means supporting jack means independently of and beneath the lever arm means for engagement therewith whereby upward movement of the jack means raises the lever arm means and thus the wheels and sections, said lever arm means including double lever arm means and comprising a first lever arm means pivotally mounted beneath one side of one opening in the track means that extend along the opposite side of the coaming and a second lever arm pivotally mounted beneath the opposite side of the other opening, means interconnecting the lever arms between the openings and the jack means being mounted to exert upward force beneath said interconnecting means.

6. A liquid-tight hatch construction including means delimiting a hatch opening, at least one cover section for closing the opening, means including fixedly mounted rolling surfaces and wheels on the section for supporting the section for rolling movement relative to the opening, compressible gasket means carried by the section and cooperating rigid sealing members supported by the means delimiting the opening for sealing the section to the opening, the fixed rolling surfaces having openings therein for receiving the wheels when the section is in closing position so as to apply the gasket means against the sealing members, lever arm means pivoted subjacent the fixed rolling surfaces for movement toward and away from the openings and including portions engageable with the wheels when they are in a position to overlie the openings and raising and lowering means independent of the lever arm means and mounted entirely beneath and engageable with the undersurface of said lever arm means for raising the same to elevate the wheels to the level of the rolling surfaces and to break the seal between the gasket means and the sealing members so that the section can be rolled to open position and to lower the wheels into the opening to reseal the gasket means and the sealing members when the section has been rolled to closed position.

7. In a hatch cover construction, means delimiting a hatch opening, rigid sealing means carried along the opposite sides and end of the opening, at least two cover sections for cooperation with the opening, track means extending along the opposite sides of the opening, extensions of said track means projecting beyond the opposite ends of the opening, each section including inner and outer ends and opposite sides, compressible gasket strip means carried by the opposite sides and outer ends of each section for sealing engagement with said rigid sealing means, wheels carried by the opposite sides of each section adjacent the inner ends thereof, vertical legs depending from the outer ends of each section adjacent and inwardly of said track extensions, wheels on said legs, additional track means at a lower level than said first-mentioned track means and extending beyond the opposite ends of the opening for accommodating the wheels on the legs, each track means having openings therein underlying the position occupied by the wheels on the respective sections and legs when the sections are closed, pivotally mounted track sections for swinging into and out of the openings in both track means, jack means for cooperation with the pivotally mounted sections of the track means along the sides of the openings, additional jack means for cooperation with the legs whereby actuation of said jack means effects raising and lowering of the cover sections, the pivotally mounted sections of the additional track means extending beyond the opposite ends of the hatch opening comprising vertical pivots and horizontally swingable sections adapted to close the openings when the cover sections are raised and to expose the openings when the cover sections are lowered to sealing relation and cooperating gasket strip means and a rigid sealing member carried by the adjacent inner ends of the sections for providing a seal between the sections and including portions cooperable with the peripheral gasket means carried by the sides of the sections, and means for releasably tightening the sections to the openings and to one another.

8. In a liquid-tight hatch construction for ships, a coaming including opposite sides and ends, at least two oppositely movable cover sections having inner and outer ends for cooperation with the coaming, track means extending along the opposite sides of the coaming, track extensions approximately at the level of said track means and extending beyond the opposite ends of the coaming for supporting the inner ends of the cover sections in open position, wheels carried by the opposite sides of each section adjacent the inner ends thereof that are adjacent to one another when the sections are closed, vertical legs depending from the opposite and outer ends of each section, wheels carried by the said legs, deck level track means for said last mentioned legs extending beyond the opposite ends of the openings for supporting the outer ends of the cover sections in open position, each said track means having openings therein for accommodating the respective wheels on the sections and legs when the cover sections are in closing relation, compressible gasket means carried by the sides and remote ends of each section, rigid sealing members on the coaming for engaging said gasket means when the cover sections are closed to provide a peripheral seal, means including pivotally mounted components mounted for swinging into and out of the openings in both track means when it is respectively desired to move the sections to open or closed position and to permit the cover sections to descend to effect sealing engagement between the gasket means and the sealing members, separate jack means adjacent the openings in the deck level track means and the openings in the first-mentioned track means respectively for raising and lowering the sections when they are to be moved relative to the coaming, cooperable gasket strip means and a rigid sealing member respectively carried by the adjacent inner ends of the sections to provide a seal between the sections, said last mentioned cooperable gasket strip means and rigid sealing member comprising a rigid sealing member extending along the inner end of one section and including vertical portions disposed adjacent the opposite sides of said one section, the compressible gasket means carried by the opposite sides of each section having projecting portions extending beyond the respective inner ends of the sections so as to abut when the sections are in closing relation, the vertical portions of said last-mentioned sealing member overlying the projecting portions of the gasket means carried by the sides of said one section, said last-mentioned compressible gasket strip means being carried by the inner end of the other section and including a portion extending transversely along the inner end of said one section and vertical end portions disposed adjacent the sides of said other section for cooperation with the said last mentioned sealing member, the vertical portions of said last mentioned rigid sealing member and said last mentioned gasket strip means having lower terminal ends in overlying sealing engagement with the projecting portions of the gasket means carried by the sides of the sections, and means for tightening the sections with all the gasket means and rigid sealing members in sealing engagement.

9. A hatch cover construction comprising means delimiting a hatch opening, at least two cover forming sections having opposite sides and inner and outer ends for cooperation with said means, supporting wheels carried by the opposite sides of the sections adjacent at least the inner ends thereof so that the sections are movable in opposite directions to effect opening and closing of the hatch, means providing wheel supporting surfaces extending at least along the opposite sides of the opening, said last mentioned means including movable portions disposed at the positions occupied by the wheels when the sections are in closing relation, said portions being movable into and out of alignment with the path of movement of the wheels to support the wheels in cover opening movement and to permit lowering of the wheels and cover sections when the same are in closing relation, means independent of said movable portions for moving the same into alignment with the path of movement of the wheels, compressible peripheral gasket means carried by the opposite sides and outer ends of each section, cooperating rigid sealing means carried by the means delimiting the opening whereby with the cover sections closed and the movable portions out of alignment with the supporting surfaces the sections by their weight effectively set the gasket means on the sealing members and the movement of the movable portions into alignment with the path of movement of the wheels would disrupt the sealing relationship between the peripheral gasket means and rigid sealing means, releasable dogging means for tightening the sections on the opening, a rigid sealing member carried by the inner end of one section that is adjacent the inner end of the other section, said member including vertical portions disposed adjacent the opposite sides of said one section, a cooperating compressible gasket strip means carried by the adjacent inner end of the other section and also including vertical portions adjacent the opposite sides of said other section, the peripheral gasket means along the opposite sides of the respective sections having projecting portions extending beyond the respective inner ends of the sections so as to be in abutting relation when the sections are closed, all said vertical portions including lower ends overlying and in sealing engagement with the projecting portions of the peripheral gasket means adjacent their abutting surfaces and the vertical portions of the rigid sealing member having an extent in the direction parallel to the sides of the section greater than the extent in the same direction of the projecting portions of the peripheral gasket means on said one section whereby the lower ends of said vertical portions of the rigid sealing member overlie the joint between said abutting surfaces and contact in sealing relation the projecting portions of the peripheral gasket means of both sections.

References Cited in the file of this patent

UNITED STATES PATENTS

| | | |
|---|---|---|
| 934,456 | McGray | Sept. 21, 1909 |
| 1,158,946 | McGray | Nov. 2, 1915 |
| 2,184,676 | Mackin | Dec. 26, 1939 |
| 2,194,012 | Dawson et al. | Mar. 19, 1940 |
| 2,697,998 | Jernstrom | Dec. 28, 1954 |
| 2,753,827 | Sabin | July 10, 1956 |
| 2,799,238 | Suderow | July 16, 1957 |

FOREIGN PATENTS

| | | |
|---|---|---|
| 262,642 | Great Britain | Dec. 16, 1926 |
| 667,357 | Great Britain | Feb. 27, 1952 |
| 698,798 | Great Britain | Oct. 21, 1953 |